United States Patent
Netsch

(10) Patent No.: US 7,265,077 B1
(45) Date of Patent: *Sep. 4, 2007

(54) LATENT IMAGE DEVELOPING SYSTEMS AND DEVICES

(76) Inventor: Bryan A. Netsch, 444 Remington Pl., Highland Village, TX (US) 75077

( * ) Notice: Subject to any disclaimer, the term of this patent is extended or adjusted under 35 U.S.C. 154(b) by 0 days.

This patent is subject to a terminal disclaimer.

(21) Appl. No.: 11/462,240

(22) Filed: Aug. 3, 2006

Related U.S. Application Data

(63) Continuation-in-part of application No. 10/906,244, filed on Feb. 10, 2005, now Pat. No. 7,087,265.

(51) Int. Cl.
*B41M 5/20* (2006.01)
*B41M 5/24* (2006.01)

(52) U.S. Cl. ............ 503/201; 503/205; 503/216; 503/226; 106/32.23

(58) Field of Classification Search ........ 503/201, 503/216, 203; 502/226
See application file for complete search history.

(56) References Cited

U.S. PATENT DOCUMENTS

| | | | |
|---|---|---|---|
| 2,293,072 A * | 8/1942 | Morrill ............ 206/81 |
| 3,900,215 A | 8/1975 | Kato et al. |
| 4,212,393 A * | 7/1980 | Lenkoff ............ 206/575 |
| 4,321,093 A | 3/1982 | Seitz |
| 4,477,593 A * | 10/1984 | Tomlinson ............ 503/205 |
| 4,557,618 A | 12/1985 | Iwata et al. |
| 4,865,938 A | 9/1989 | Sakai et al. |
| 4,943,089 A | 7/1990 | Reardon |
| 5,075,278 A | 12/1991 | Vassiliades |
| 5,234,344 A * | 8/1993 | Lenkoff ............ 434/84 |
| 5,415,434 A | 5/1995 | Kawashima |
| 5,485,792 A | 1/1996 | Keyser et al. |
| 5,492,558 A | 2/1996 | Miller et al. |
| 5,503,665 A | 4/1996 | Miller et al. |
| 5,814,579 A * | 9/1998 | Dotson et al. ............ 503/201 |
| 6,114,281 A | 9/2000 | Belding et al. |
| 6,162,485 A | 12/2000 | Chang |
| 6,293,667 B1 | 9/2001 | Gregory et al. |
| 6,905,539 B2 | 6/2005 | Patel et al. |
| 6,967,069 B2 * | 11/2005 | Wu et al. ............ 430/59.4 |
| 2003/0236165 A1 | 12/2003 | Peebles et al. |

FOREIGN PATENT DOCUMENTS

| CA | 2149946 | 11/1996 |
|---|---|---|
| EP | 0017889 A1 | 10/1980 |

\* cited by examiner

*Primary Examiner*—Daniel J. Colilla
*Assistant Examiner*—Marissa Ferguson-Samreth
(74) *Attorney, Agent, or Firm*—Luedeka, Neely & Graham, PC

(57) ABSTRACT

A latent image developing system, a novelty kit, and an ink composition for printing latent images on a substrate. The latent image developing system includes a first substrate containing a colorless image deposited on a first surface thereof. A developer component is provided that is reactive with the colorless image to provide a visible image. The developer component is selected from a developer instrument, a developer finger paint, a developer coating on a first surface of a substantially transparent substrate for adhesive attachment to the first substrate, and a combination of one or more of the developer instrument, the developer finger paint, and the developer coating. The latent image developing system optionally includes, an image blocking instrument for concealing at least a portion of the visible image. The image blocking instrument includes a blocking composition applicator and an aqueous mixture of blocking composition and water.

15 Claims, 6 Drawing Sheets

LATENT IMAGE DEVELOPING SYSTEMS AND DEVICES

RELATED APPLICATIONS

This application is a continuation-in-part of application Ser. No. 10/906,244, filed Feb. 10, 2005, now U.S. Pat. No. 7,087,265.

FIELD

The disclosure relates to hidden or latent full color images and to devices containing the images and means capable of developing the images.

BACKGROUND AND SUMMARY

Relatively inexpensive novelty items containing hidden images are produced in large quantities and are used in a variety of applications including game pieces, food packaging prizes, educational children's books and the like. Many of these items contain hidden images. The images may be developed or revealed by applying a liquid or solid developer to the hidden image area of the object, by removing an opaque coating over the image, by heating the image, by rubbing the image to rupture microcapsules containing color developer or colorant and the like. The disadvantage of many of these items is that the image is often blurry, weakly developed and/or does not contain vibrant well defined colors. Another disadvantage of such objects is that the developer or solvent is often toxic or hazardous and thus could be dangerous when used by unsupervised children or infants.

Color forming dyes which are applied to a substrate in the form of microcapsules have limited application for producing images as the microcapsules are relatively fragile and care must be taken to assure that the microcapsules are applied to the substrate without substantial breakage of the microcapsules. Scuffing the printed surface or exposing the printed surface to heat may prematurely rupture the microcapsules. Thus it is difficult to print latent or hidden images using microcapsules containing the reactive components by four color process techniques. Another disadvantage of microcapsules containing the color former or developer compound is that the developed colors are somewhat diluted by the presence of the microcapsule material and are less vibrant than colors developed in the absence of microcapsules.

In addition to the use of microcapsules, chromogenic compounds have been dispersed in a wax medium and applied to a substrate. The wax medium, however, may dilute or blur the color forming compounds and delay or retard the speed the image develops. As with the microcapsules described above, scuffing or exposing the wax medium to heat may cause premature release of the color forming compounds or developer. Accordingly, there remains a need for cost effect devices and systems capable of applying color forming compounds to substrates to produce full color images having improved color vibrancy.

Considering the foregoing, the disclosure provides a latent image developing system, a novelty kit, and an ink composition for printing latent images on a substrate. The latent image developing system includes a first substrate containing a colorless image deposited on a first surface thereof. A developer component is provided that is reactive with the colorless image to provide a visible image. The developer component is selected from a developer instrument, a developer finger paint, a developer coating on a first surface of a substantially transparent substrate for adhesive attachment to the first substrate, and a combination of one or more of the developer instrument, the developer finger paint, and the developer coating. The latent image developing system optionally includes, an image blocking instrument for concealing at least a portion of the visible image. The image blocking instrument includes a blocking composition applicator and an aqueous mixture of blocking composition and water.

In another aspect the disclosure provides a novelty kit having therein a first substrate containing a colorless image deposited on a first surface thereof. A developer component is included in the novelty kit that is reactive with the colorless image to provide a visible image. The developer component selected from a developer instrument, a developer finger paint, a developer coating on a first surface of a second substrate for adhesive attachment to the first substrate, and a combination of one or more of the developer instrument, the developer finger paint, and the developer coating. An optional component of the novelty kit is an image blocking instrument for concealing at least a portion of the visible image. The image blocking instrument includes a blocking composition applicator and an aqueous mixture of blocking composition and water.

Yet another embodiment of the disclosure provides an ink composition for printing a colorless image on a first substrate. The ink composition includes a substantially colorless flexographic ink base made of a binder resin and from about 5 to about 20 percent by weight of a substantially colorless compound dissolved in a solvent portion of the ink base for printing the colorless image on the first substrate. The ink composition is reactive with a developer component selected from a developer compound dissolved in from about 35 to about 85 percent carrier fluid, a water-base developer finger paint, a developer coating on a first surface of a second substrate for adhesive attachment to the first substrate, and a combination of one or more of the developer instrument, the water-base developer finger paint, and the developer coating. The developer component is effective to provide a visible image on the first substrate when reacted with the ink composition.

An important advantage of embodiments of the disclosure is that black and white, spot color, or full color images may be developed rapidly which have excellent resolution and/or possess vibrant colors with high color intensity without having to apply relatively heavy ink coverage to a substrate to obtain the high color intensity images. Still another advantage of embodiments of the disclosure is that developer coating on the second substrate may provide images that are substantially permanent and cannot be readily altered or modified thereby improving the security of the developed images. Another advantage of the embodiments of the disclosure is that alternate method of developing an image may be used with the same latent image ink composition to provide a variety of novelty items. A further advantage of the compositions and systems described herein is that each of the components is substantially colorless until applied to a previously printed or coated substrate. Accordingly, the developer component and ink compositions may not stain or mark clothing, skin, furniture, walls or other objects. Still another advantage of the embodiments described herein is the ability to provide clandestine messages by selective blocking development of latent images on a substrate.

BRIEF DESCRIPTION OF THE DRAWINGS

The above and other features of the disclosed embodiments may be further described in the following detailed specification in conjunction with the accompanying drawings in which.

DETAILED DESCRIPTION OF EXEMPLARY EMBODIMENTS

In the methods and systems described herein, components of the methods and systems may be deposited or printed on a substrate, preferably as a latent or substantially invisible image or as a substantially invisible developer component. By "substantially invisible" means that the deposited area may have a slight discoloration or may vary in tint from the adjacent substrate, however, to the casual observer, the variation in tint or coloration is so slight as to be essentially imperceptible prior to developing the image by the techniques described herein.

In a first embodiment of the disclosure illustrated in FIGS. 1-4, a substrate is provided with a latent image 12 printed thereon. The substrate 10 may be made from a wide variety of materials including, but not limited to, paper, wood, polyester, polystyrene, polypropylene, ceramic, metal, natural and synthetic cloth or fabric, and the like. A suitable plastic substrate 10 is polyester. Likewise, suitable paper substrates 10 include offset, matte or coated papers. A particularly useful paper substrate is offset paper available from Boise Cascade and MeadWestvaco paper companies and has a weight of about 50 to about 70 pounds per ream.

The latent image 12 may be printed on the substrate 10 by a wide variety of printing techniques including, but not limited to, flexographic, lithographic, sheet fed, web offset, rotogravure, gravure, screen printing, ink jet printing, and variable image printing techniques. Printing techniques which may be used to print the latent image 12 on the substrate 12 include spot printing and process printing. A particularly preferred printing technique is 3 or 4 color process printing. Process printing may be used with a web-offset or flexographic printer to deposit the latent image 12 on the substrate 10. When developed, 3 or 4 color process printed images may be more visually pleasing than spot printing the images because a wider variety of colors may be printed using process printed images. Also, process printed images enable use of lower weights of ink to be printed while providing higher intensity of printed images.

In the case of printing the latent image 12 with a variety of substantially colorless chromogenic ink formulations, a flexographic printing technique is particularly suitable and provides the latent image 12 having a image thickness ranging from about 0.25 micron to about 3 microns. Thicker or thinner layers of the image 12 may be used to provide variation in color intensity upon development of the image.

Figure 1:
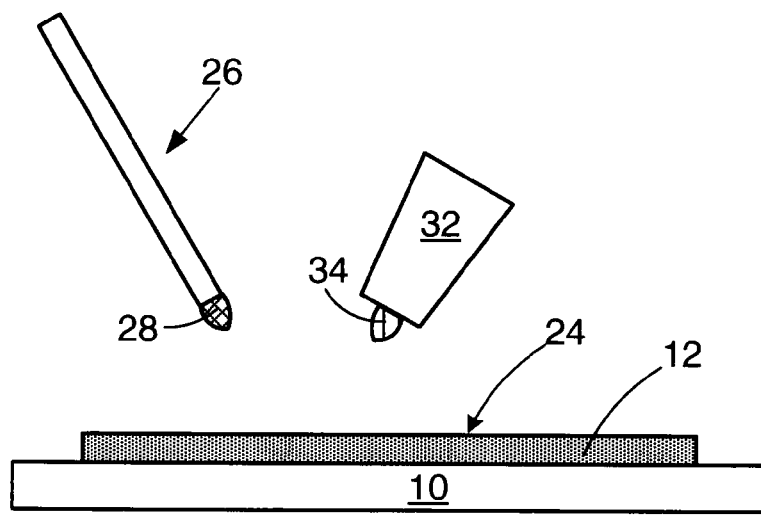
FIG. 1 is an elevational view, not to scale, of a latent image printed substrate, image developer device, and image blocker device according to a first embodiment of the disclosure.
Figure 2:
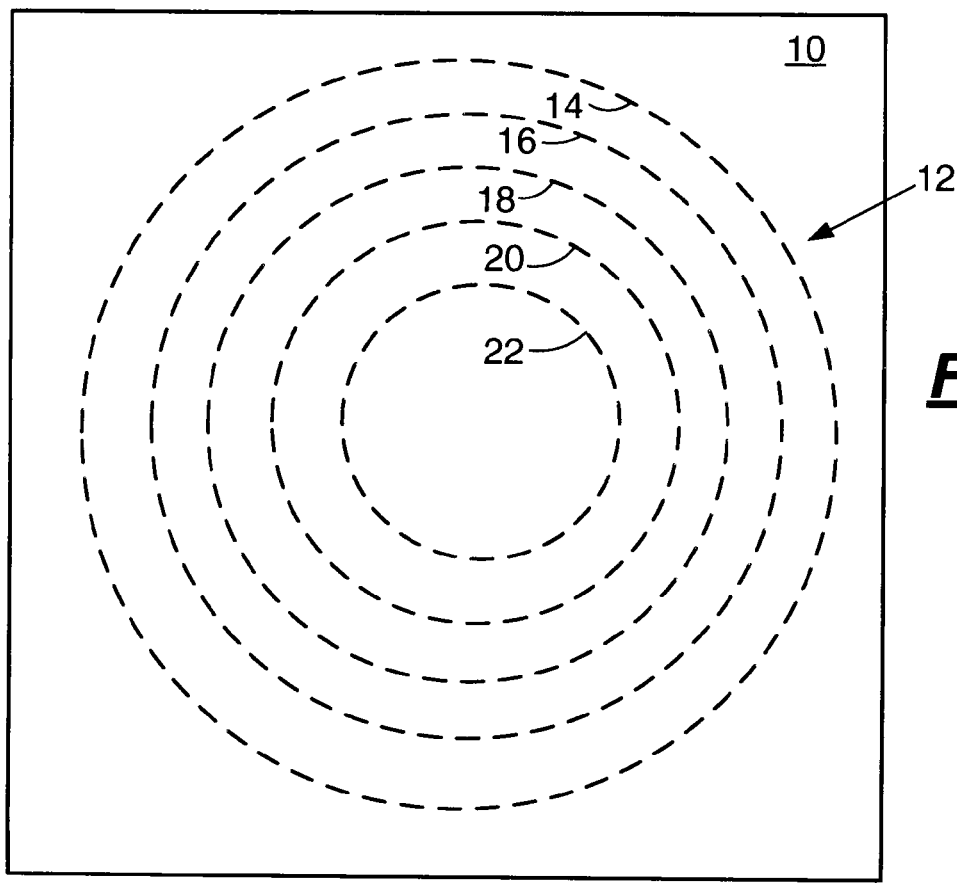
FIG. 2 is a plan view of a latent image printed on a substrate according to the first embodiment of the disclosure.

A suitable flexographic ink composition for providing the latent image 12 may include a solvent-based ink base suitable for use in a flexographic printing process. Ink compositions, as described herein, are substantially colorless and adaptable to four color processing operations. The substrate 10 containing the latent image 12, before development is shown in FIG. 2 wherein the broken line concentric circles 14, 16, 18, 20, and 22, represent different latent image colors.

With respect to the embodiments illustrated in FIGS. 1-4, the ink composition used for applying the latent image 12 to the substrate 10 may include a solvent based ink base containing one or more substantially colorless chromogenic compounds selected from colorless dyes and colorless pigments. For the purpose of simplicity, the chromogenic compound may be referred to as a colorless dye, however, the term colorless dye, when used also includes other colorless chromogenic compounds such as colorless pigments and the like.

Accordingly, the ink base may include a colorless dye, a polyamide resin, and one or more of ethanol, heptane, n-propyl acetate, isopropyl alcohol, n-propanol, and nitrocellulose. Such ink compositions may contain from about 1 to about 10 percent by weight colorless dye, from about 10 to about 45 percent by weight polyamide resin, from about 10 to about 45 percent by weight ethanol, from about 5 to about 15 percent by weight heptane, and from about 0.5 to about 10 percent by weight of one or more of the other components.

The colorless dye may be dissolved in a solvent portion of the ink base using conventional high shear mixing with heating. After the colorless dye is dissolved in the solvent portion of the ink base, the dissolved dye and a varnish portion of the ink base are then mixed at relatively low speeds with other components of the ink base. Suitable colorless dyes may be available from Intense Printing, Inc., of Dallas, Tex. under the trade names IPI 2537 YL (yellow), IPI 21115 BK (black), IPI 32212 BL (blue), IPI 32219 BLS (higher solubility blue), and IPI 854 RD (red). Exemplary ink formulations containing one or more of the foregoing dyes are contained in the following tables.

TABLE 1

| Colorless Ink Component | Weight Percent Range |
| --- | --- |
| N-propanol | 0.5-1.5 |
| Isopropyl Alcohol | 1.0-4.0 |
| N-propyl Acetate | 1.0-4.0 |
| Heptane | 7.5-9.5 |
| Ethanol | 35.0-45.0 |
| Polyamide Resin Flexographic Ink Base | 35.0-45.0 |
| Colorless Dye(s) | 4.5-6.5 |

The foregoing ink formulation is generally considered a solvent-base ink formulation. However, the colorless dyes may also be used with a substantially aqueous-base ink formulation. As with the solvent-base formulation given in table 1, the colorless dye for the aqueous-base formulation may be dissolved in a solvent portion of the ink base containing a minor amount of the copolymer using conventional high shear mixing with heating. After the colorless dye is dissolved in the solvent portion of the ink base, the dissolved dye and the remaining copolymer portion of the ink base are then mixed at relatively low speeds. A suitable aqueous-base ink formulation is contained in the following table 2.

TABLE 2

| Colorless Ink Component | Weight Percent Range |
| --- | --- |
| Styrene/acrylic copolymer suspended in water | 30.0-80.0 |
| Isopropyl Alcohol | 2.0-10.0 |
| Dipropylene glycol monomethyl ether | 1.0-3.0 |
| 2,4,7.9-tetramethyl-5-decyne-4,7-diol | 1.0-3.0 |
| Colorless Dye(s) | 4.5-6.5 |

While the foregoing compositions are particularly suitable for the first embodiment of the disclosure, other colorless ink formulations may be used with suitable developer components and blocker compounds to provide the benefits and advantages described herein. Additional, two or more of the dyes may be combined to provide higher intensity color development. For example, a relatively low solubility blue dye IPI 32212 BL) mixed with a relatively high solubility blue dye (IPI 32219 BLS) may provide a greater color intensity than either one of the dyes alone at a same dye concentration as the concentration of the mixed dyes.

Additional components may be present in the ink formulations including, but not limited to, film formers, fillers, binders, waxes, non-volatile diluents, uv absorbers, antioxidants and starch particles (stilt). Film formers, which may be used include polyvinyl pyrrolidone, polyvinyl alcohol, starch, grafted starch and the like. In addition, the film former provides excellent rheological properties to the ink formulation that may permit the image to be spot coated or printed using conventional flexographic printing equipment. The film former may also aid in maintaining the chromogenic compound at the surface of the substrate 10 so that solvent interaction with a developer composition produces a sharp image on the surface of the substrate 10.

The binders with may be used to prepare the ink formulations for printing on the substrate 10 may be selected from partially or fully hydrolyzed polyvinyl alcohols, natural or modified starches, acrylics and the like. A preferred binder is a modified starch available under the trade name PENSIZE 730 binder available from Penford Products of Cedar Rapids, Iowa.

Fillers which may be included in the ink formulations may be selected from any number of compounds such as calcium carbonate, wheat starch, rice starch, nitrous cellulose, and/or polyamide resin.

Diluents may also be used to reduce the viscosity of the ink formulation for printing and to reduce curling of the coated substrate. Suitable diluents include, but are not limited to, ethyl alcohol, isopropyl alcohol, and methyl glucocide.

The amount of ink formulation deposited or printed on the substrate 10 may vary with the characteristics of the substrate 10 and the use thereof. Higher coating weights may be used for more porous substrates 10, whereas lower coating weights may be acceptable for substantially non-porous substrates 10. For many substrates, it is desirable to apply a sub-layer between the substrate 10 and the latent image 12 in order to reduce the absorbence of ink into the substrate 10 or reduce the contrast between the latent image 12 and the non-printed portions of the substrate 10 adjacent the printed areas. Such sublayer may comprise a pigmented coating of ink such as an amine solubilized acrylic, overprint varnish or other material which substantially reduces the contrast between the substrate 10 and the latent image printed 12 printed on the substrate 10. A preferred sublayer is a starch-based coating containing $TiO_2$ or $CaCO_3$ plus an optical brightener. It is particularly desirable to use a sublayer which provides a difference in reflectance between the substrate 10 and the latent image 12 of less than about five percent.

The preferred coating weights of the latent image 12 printed on the substrate 10 may range from about 0.25 to about 2 pounds per 1300 square feet. Accordingly, the thickness of the latent image 12 after drying may range from about 0.25 micron to about 3 micron. The preferred thickness of the latent image 12 is about 0.65 micron.

Before the substrate 10 is printed with the latent image 12, it may be desirable to coat an opposing surface of the substrate 10 with a varnish or stiffening material to reduce substrate 10 curling particularly when the substrate 10 is a thin web such as paper or a plastic film. A particularly suitable varnish is a flexo applied sizing varnish.

The ink formulations provided above in Table 1, may be spot printed on a substrate 10 using a COMPCO COMAMANDER printer with 10-11 billionths of a cubic meter (BCM), 200 line anilox rolls with a doctor blade or a NILPETER printer with 8-9 BCM, 300 anilox rolls. Other printing techniques may also be used to provide the latent image 12 on the substrate 10 according to the disclosed embodiments and the amount of base ink to dye may be adjusted for lower or higher BCM anilox rolls.

In an alternative embodiment described in more detail below, the substrate 10 may include a latent image 12 that includes an adhesive component for attaching a first surface 24 of the image 12 to a second substrate containing a developer compound coated thereon.

In order to develop the latent image 12, a developer component reactive with the latent image 12 is provided. The developer component may be selected from a developer instrument 26, a developer finger paint, a developer coating on a first surface of a second substrate, and a combination of one or more of the developer instrument 26, the developer finger paint, and the developer coating. The developer instrument 26, illustrated in FIG. 1, may be used to apply a developer composition to selected portions of the latent image 12. The instrument 26 for applying the developer composition to the latent image 12 may include solvent pen having a felt solvent dispensing tip 28. The production of suitable felt tipped pens for dispensing solvents is well known in the art. Other developer compositions may be applied by use of other devices such as crayon-like developers, developer towelettes, and other developer carrier vessels.

Figure 3:
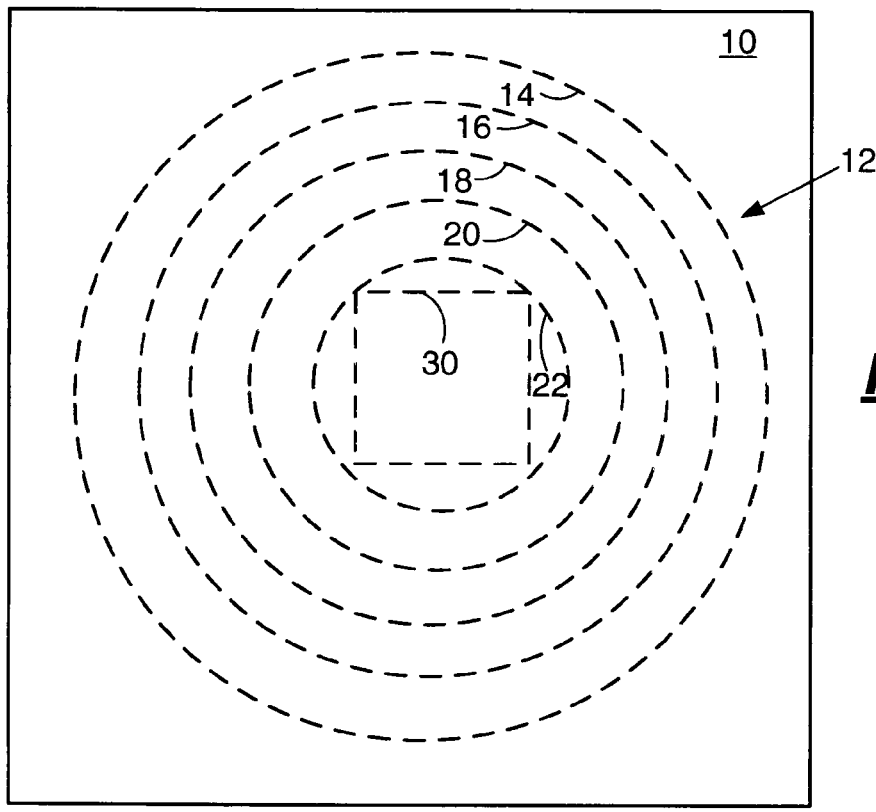
FIG. 3 is a plan view of the latent image of FIG. 3 after a blocker composition has been applied to the latent image in a particular area.

In a second embodiment of the disclosure, prior to developing the latent image 12, a secret message may be written on the latent image 12 as indicated by the broken-line rectangle 30 in FIG. 3. The secret message may be written by applying a blocking composition from a blocking marker 32 having a felt dispensing tip 34 to selected portions of the latent image 12. The blocking marker 32 may be used to prevent development of selected portions of the latent image 12.

A suitable blocking composition for blocking development of the latent image 12 in the rectangle 30 may an amine compound dissolved in water. A particularly suitable amine compound is triethanolamine. Accordingly, the blocking formulation may include from about 15 to about 35 weight percent triethanolamine and from about 65 to about 85 weight percent water. Above this range, the blocking composition may be less effective. While not desiring to be bound by theory, it is believed that the blocking composition may absorb less into the substrate above about 35 wt. %. Accordingly, an optimal blocking formulation may include from about 20 to about 25 wt. % triethanolamine and from about 75 to about 80 wt. % water.

Figure 4:
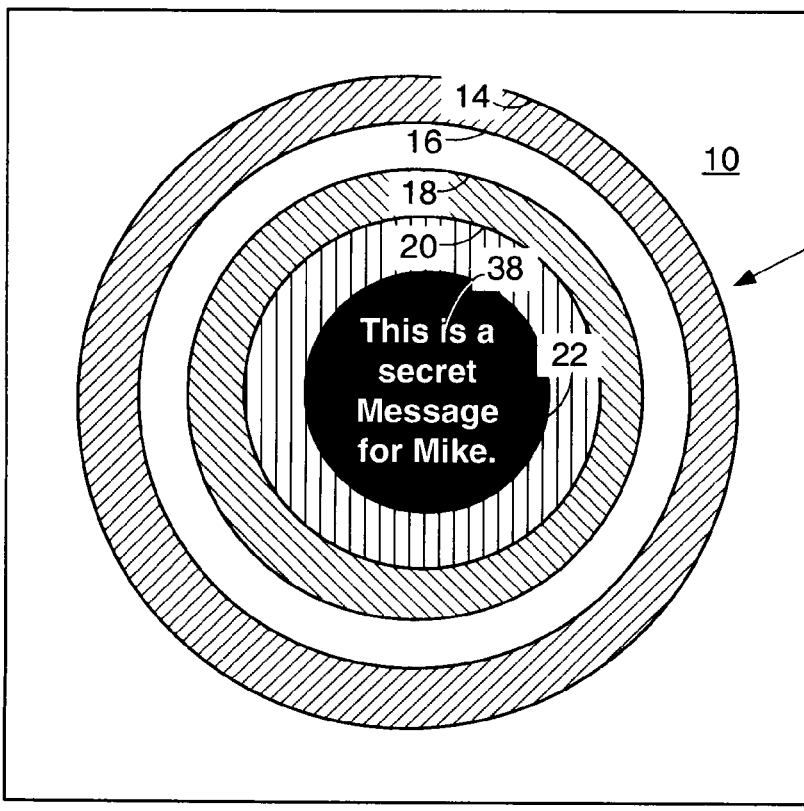
FIG. 4 is a plan view of the developed image of FIG. 3.

In FIG. 4, the developer component has been applied to the entire latent image 12 to provide a visible image 36 with the exception of a portion 38 of the image to which the blocking composition was applied. In the alternative, selective portions of the image may be developed by applying the developer composition to only such portions of the image as is desired to be developed. As shown in FIG. 4, each of the concentric circles 14-22 contains a different color upon development. The compositions used to provide the different colors in the concentric circles 14-22 may be applied in a three or four color printing process to provide a wide variety of colors that may be developed as described herein.

In accordance with the foregoing embodiment, a user may encode secret messages by blocking development of selected areas of the latent image 12 using the blocking marker 32. The secret messages 38 may only be revealed by another user having a developer component suitable for developing the latent image as shown in FIG. 4 so that the secret message 38 is revealed.

The developer composition for developing the latent image 12 using the developer instrument 26 may be selected from acidic clays and unsubstituted or ring-substituted phenols, phenolic resins, sulfone compounds, alkylhydroxybenzoic acid compounds and salicylic acid or salicylate and their metal salts or combinations of two or more of the foregoing. A suitable color developer composition for developing latent images 12 may be a benzoic acid compound dissolved in an alcohol carrier fluid. For example, the developer composition may include from about 5 to about 15 weight percent salicylic acid, from about 65 to about 85 percent by weight isopropyl alcohol and from about 10 to about 20 percent by weight bisphenolic compounds.

Another developer composition that may be used in the developer instrument includes from about 30 to about 65 percent by weight metal chloride, from about 10 to about 25 weight percent water, from about 10 to about 25 weight percent propylene glycol, and from about 10 to about 25 weight percent isopropyl alcohol. While zinc chloride is a particularly desirable metal chloride, other metal cations may also be used, such as cadmium (III), zirconium (II), cobalt (II), strontium (II), aluminum (III), copper (III), and tin (II).

Figure 5:
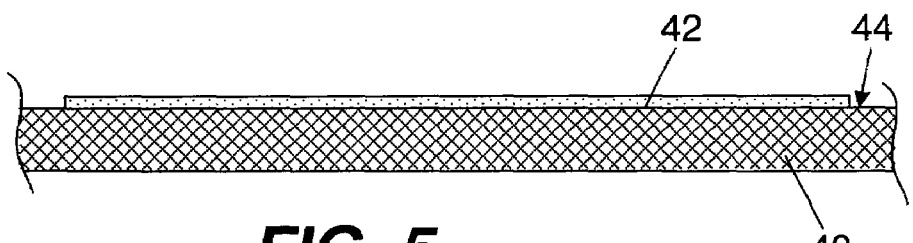
FIG. 5 is cross-sectional views, not to scale, of a second substrates containing a developer coating applied thereto.

A third embodiment of the disclosure is illustrated in FIGS. 5-8. FIG. 5 illustrates construction of a second substrate 40 containing an image developing layer such as color developer layer 42 on a surface 44 thereof. Like the first substrate 10, the second substrate 40 may be selected from glass, ceramic, porous materials such as natural or synthetic paper and substantially transparent polymeric films such as films made from polyethylene, polypropylene, polyvinyl chloride, polystyrene, polyester, polybutylene and the like, provided at least one of the first or second substrates is a substantially transparent polymeric film.

Substantially transparent films useful as the first substrate 10 or second substrate 40 preferably have a thickness that may range from about 10 to about 100 microns. Particularly preferred films are substantially optically clear, about 50 micron thick, and are print receptive films. Such films include, but are not limited to, polyethylene terephthalate (PET) films available from Mitsubishi Polyester Film LLC of Greer, S.C., under the trade name HOSTAPHAN 4400 and from SKC, Inc. of Covington, Ga. under the trade name SH-81.

The length and width of the transparent film is not critical to the invention and may be any suitable length and width. The film may also be cut into selected shapes for application to the first substrate. The terms "substantially transparent" and "substantially optically clear" mean that details of objects or images covered by such a film are essentially visible through the film as opposed to blocking all or a substantial portion of the object or image from view.

For the purpose of illustration only, the second embodiment will now be described with the latent or hidden image 12 being printed on an opaque substrate 10 and the developer layer 42 being coated onto a substantially transparent substrate 40. It will be recognized by those of ordinary skill in the art that the latent or hidden image 12 may be printed on the substantially transparent substrate 40 and the developer layer may be included on an opaque substrate 10 or on another substantially transparent substrate.

The layer 42 also includes a micro-encapsulated organic solvent which may be selected from compounds such as alcohols, dioctylphthalate (DOP), di-isooctylphthalate (DIOP), isopropyl myristate (IPM), isopropyl palmitate (IPP), soybean oil (unepoxidized), castor oil, linseed oil, olive oil, mineral oil, petrolatum (otherwise known as petroleum jelly or paraffin jelly) and the like or mixtures thereof. The solvent is preferably compatible with the chromogenic compound and the developer composition. A preferred micro-encapsulated solvent is available from Schenectady International, Inc. under the trade name HRJ-15151. The layer 42 may include from about 20 to about 50 percent by weight of the micro-encapsulated solvent based on the dry weight of micro-encapsulated solvent in the layer 42.

It is preferred that microcapsules for the micro-encapsulated solvent have relatively thin walls so that rupture of the microcapsules to release the solvent may be readily achieved. However, the walls of the microcapsules should not be so thin that it is difficult to coat the layer 42 on a substrate surface without rupturing a substantial portion of the microcapsules. Also, it is desirable that premature rupture of the micro-capsules not occur when handling the second substrate 40. Accordingly, a preferred microcapsule wall content may range from about 5 to about 10 percent by weight of the total weight of the microcapsule and solvent. The term "wall content" means the weight percentage of the microcapsule that is provided by the walls containing the solvent.

The wall thickness of the microcapsules for a particular wall content may vary according to the size or diameter of the microcapsules. Typically, the micro-capsules have a diameter ranging from about 5 to about 10 microns. It is also preferred that the micro-encapsulated solvent be readily dispersible in an aqueous fluid for mixing with the developer compound described above and an adhesive, as described below.

Another component of layer 42 is an adhesive for retaining the developer compound and micro-encapsulated solvent on the second substrate 40 and for attaching the second substrate 40 to the first substrate 10. A preferred adhesive for use as the continuous phase of layer 42 is a pressure sensitive adhesive which enables substrates 40 and 10 to be fixedly attached to one another during the image developing step. A preferred pressure sensitive adhesive is an aqueous-based adhesive such as an adhesive available from Dyna-Tech Adhesives of Grafton, West Virginia under the trade name TECHCRYL 6136. The amount of pressure sensitive adhesive in layer 42 may range from about 20 to about 60% by weight of the total dry weight of layer 42.

Other minor components used to provide layer 42 include, but are not limited to an anti-foam agent and a filler such as hydrophobic silica. The amount of the other components is typically less than about 0.5 weight percent of a formulation containing the adhesive and microencapsulated solvent components.

Figure 6:
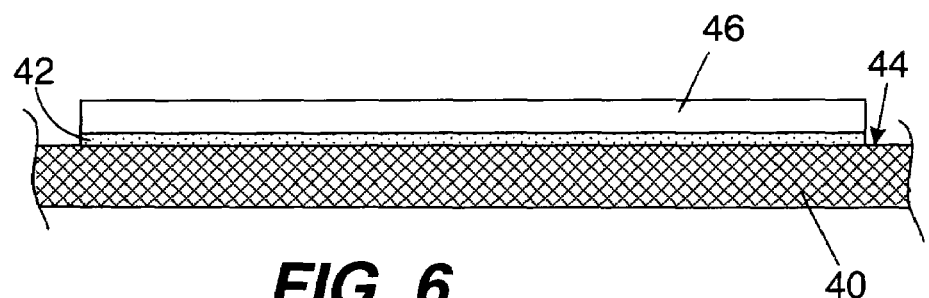
FIG. 6 is a cross-sectional view, not to scale, of a second substrate composite material.

In order to protect layer 42 containing an adhesive, the developer composition, and the micro-encapsulated solvent for the chromogenic compounds and developer composition, a cover web or release liner 46 as illustrated in FIG. 6 is removably attached to layer 42. The release liner 46 preferably includes a substrate made from natural or synthetic paper that is coated to contain a non-sticking surface on the side of the release liner 46 adjacent to layer 42. The non-stick coating may be selected from silicone-containing polymers, waxes, various derivative compounds of polyvinyl alcohols and polyvinyl ethers of alkyl alcohols. The coating should be sufficient to enable the liner 46 to be readily removed from layer 42 without significantly affecting the integrity of layer 42. A suitable release liner is a bleached polycoated paper available from Loparex, Inc. of Willowbrook, Ill. having a thickness of about 165 microns. During manufacture, layer 42 may be applied to the surface 44 of the second substrate 40 or to the release liner 46 for transfer to the surface 44 of the second substrate 40.

Figure 7A:
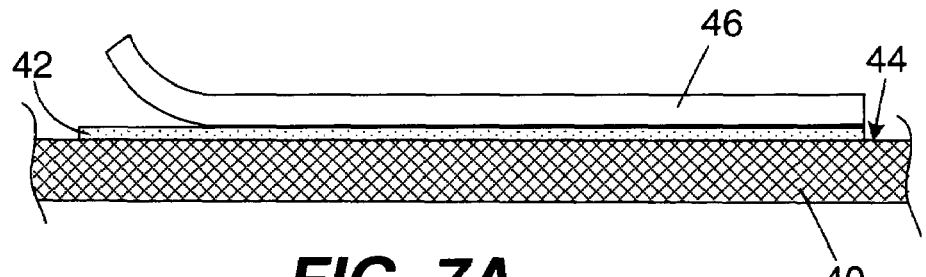
FIGS. 7A-7C illustrate steps in a method for developing a latent or hidden image.
Figure 7B:
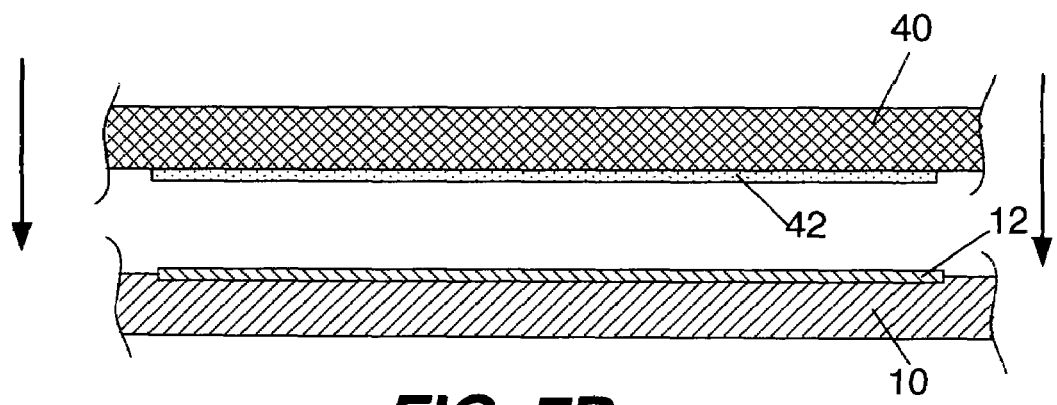
Figure 7C:
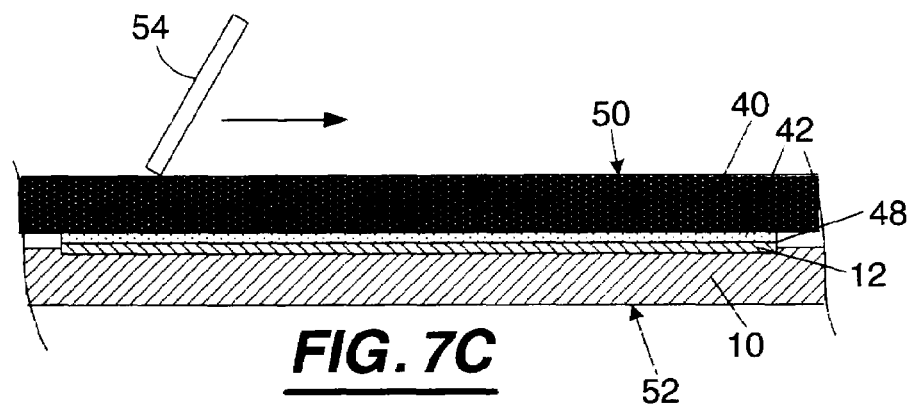

A process for developing a latent or hidden image is shown in the sequence of FIGS. 7A-7C. In order to prepare substrate 40 for attachment to substrate 10, release liner 46 is peeled away or otherwise detached from layer 42 containing the developer composition, micro-encapsulated solvent, and adhesive. Next, substrates 40 and 10 are placed closely adjacent one another so that layer 42 is opposite the hidden or latent image 12 printed on substrate 10. The substrates 40 and 10 are pressed together to promote substantial interfacial contact at an interface location 48 between the image 12 and the layer 42.

In order to rupture at least a portion of the microcapsules in the layer 42 and release sufficient solvent to interact with the developer composition and image 12, a second surface 50 of the second substrate 40 or a second surface 52 of the first substrate 10 may be rubbed with a fingernail, coin, or other substantially rigid object 54 that is capable of rupturing the microcapsules in layer 42. As the surface 50 or 52 is rubbed, microcapsules containing the solvent are ruptured providing an amount of solvent suitable for causing reaction between the chromogenic compound in image 12 and the developer composition in layer 42. However, because the solvent is contained in microcapsules that are attached to layer 42, there is no liquid solvent or developer to spill or otherwise come in contact with a user's hands or clothing.

Figure 8:
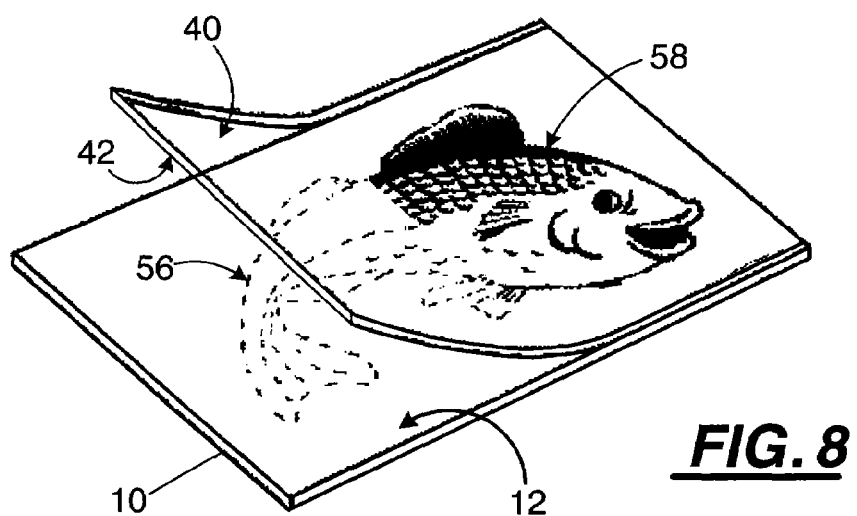
FIG. 8 is a perspective view of a partially developed image using an image developing device according to an embodiment of the disclosure.

The progress of image development as substrate 40 is attached to substrate 10 is illustrated by reference to FIG. 8. The broken lines on substrate 10 represent a hidden or latent image 56. After removal of the release liner 46 (FIG. 7A), substrate 40 is placed adjacent to substrate 10 as shown beginning at point A (FIG. 8). As the layer 42 comes into contact with the image 56, and the second surface 50 of the substrate 40 is rubbed, at least a portion of the microcapsules are ruptured, thereby releasing solvent. The solvent enables reaction between the chromogenic compounds in latent image 56 and the developer composition in layer 42 thereby producing a visible image 58 having vibrant colors. As a consequence of use of a pressure sensitive adhesive either in layer 42 or adjacent to layer 42, substrate 40 may be fixedly attached to substrate 10 producing a substantially permanent visible image 58.

In the alternative embodiment, the first surface of substrate 10 may include a pressure sensitive adhesive in addition to the latent image 12. In such an embodiment, layer 42 on substrate 40 may be provided by dispersing the developer composition and micro-encapsulated solvent in a suitable aqueous binder. Contact between substrate 10 and substrate 40 and rupture of the microcapsules to release solvent and develop the image is generally in accordance with the method described above with reference to FIGS. 7A-7B except that the release liner 46 is attached to the latent image 12 on substrate 10 rather than to substrate 40.

In yet another alternative embodiment, the first surface of substrate 10 may include the micro-encapsulated solvent, described above, in addition to the latent image 12. In such an embodiment, layer 42 on substrate 40 may be provided by dispersing the developer composition in the pressure sensitive adhesive that is applied to substrate 40. Contact between substrate 10 and substrate 40 and rupture of the microcapsules to release solvent and develop the image is generally in accordance with the method described above.

Figure 9:
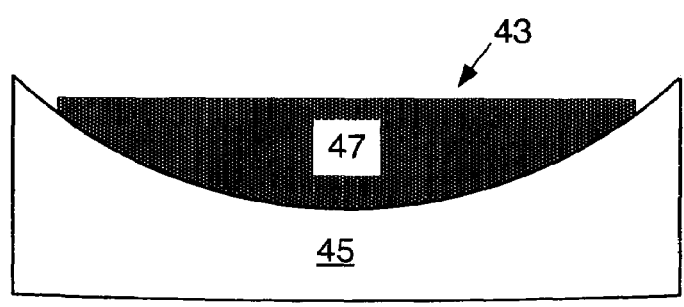
FIG. 9 is a cross-sectional view, not to scale, of a finger paint developer device according to another embodiment of the disclosure.
Figure 12:
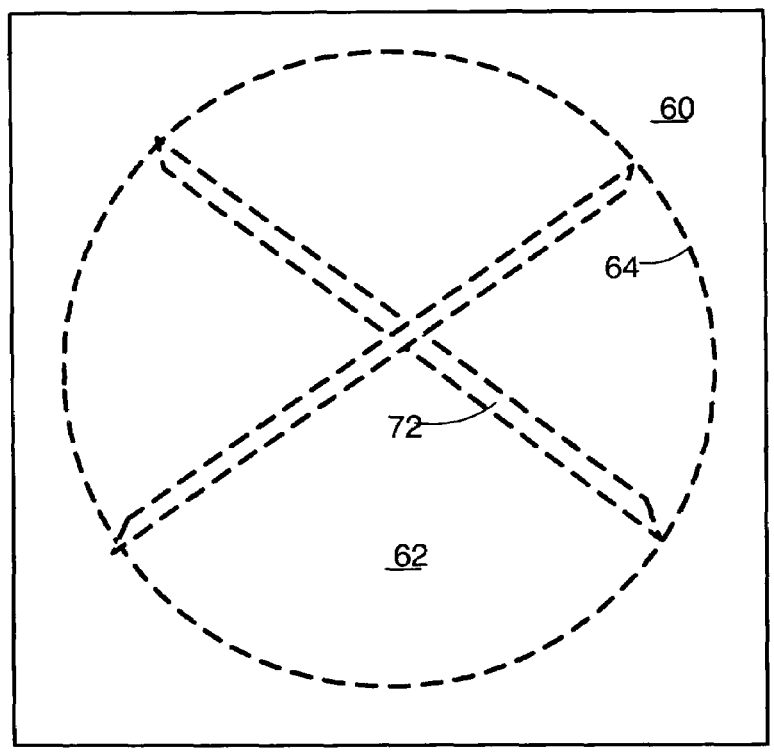
FIG. 12 is a plan view of the substrate of FIG. 11 after a blocking device has been used for preventing development of an image on a portion of the substrate containing developer compound in FIG. 11.

In an alternative embodiment, a portion of the image 12 may be developed by a user's fingers by dipping one or more fingers in a developer finger paint device 43 illustrated in FIG. 9. The developer finger paint device 43 includes a holding vessel 45 for a finger paint composition 47 and may include a cover or film layer over the finger paint composition 47 to reduce evaporation thereof when not being used. The finger paint composition 47 may include a thixotropic water-base paint component containing the micro-encapsulated solvent described above and the developer compound described above. In all other respects, the finger paint device 43 may be used to develop the image 12 on the substrate 10 by rubbing one or more fingers containing the finger paint composition 47 over the image 12 with sufficient pressure to rupture at least a portion of the micro-capsules in the finger paint composition 47.

Other embodiments of the disclosure include developing the image 12 or 56 on the substrate 10 by a combination of use of the developer instrument 26, the developer finger paint 47, and the substrate 40 containing the developer composition. In such an embodiment, a first portion of the image 12 or 56 may be developed with the developer instrument 26, or developer finger paint 47, and a second portion of the image 12 or 56 may be developed with the developer layer 42 on substrate 40 by attaching substrate 40 to the second portion of the image 12 or 56. In any of the foregoing embodiments, the marker 32 containing the blocking composition may be used to provide secret or encoded messages as described above.

A fourth embodiment of the disclosure is illustrated in FIGS. 10-13. In this embodiment, a substrate 60 has a developer layer 62 containing a developer composition printed thereon. The substrate 60 containing the printed developer layer 62 is illustrated in plan view in FIG. 11, wherein the developer layer 62 is indicated by the broken line 64.

A printing technique for applying the developer layer 62 to the substrate 60 may include any of the well known printing and substrate coating techniques. Application of the developer composition may be over the entire substrate 60 or may be in selected areas of the substrate 60. Ink jet printing, screen printing, rotogravure printing, flexographic printing, and the like may be used to apply the developer layer 62 to selected portions of the substrate 60. Roll coating, blade coating, dipping, spray coating, and the like may be used to coat an entire portion of the substrate 60. The amount of developer composition applied to the substrate 60 to provide the developer layer 62 may range from about 0.35 micron to about 4.5 microns or more. The developer composition may be applied evenly over the entire substrate 60 or different amounts of developer composition may be applied to different portions of the substrate to provide variations in the intensity of the images and the speed at which the images become visible to provide different image effects.

An advantage of the developer composition in combination with colorless chromogenic compositions is that lighter weight color developer laydown may be used to provide fine detail images and images having vibrant colors, whereas conventional compositions require heavy weight laydown amounts of developer to provide image intensities that only approach the image intensities of the disclosed embodiments. Accordingly, a flexographic process using a 200-400 line anilox roll may apply sufficient developer composition to provide high resolution images upon application of a colorless chromogenic composition to the developer layer 62.

Developer compositions that may be used for the developer layer 62 include, but are not limited to, acidic clays and unsubstituted or ring-substituted phenols, phenolic resins, sulfone compounds, alkylhydroxybenzoic acid compounds and salicylic acid or salicylate and their metal salts or combinations of two or more of the foregoing. Accordingly, a preferred color developer composition may include a benzoic acid, 2-hydroxy-3,5-bis(1-phenylethyl)-, zinc salt and (9,10-dihydro-9-oxa-10-phosphophenanthrene-10-oxide) copolymer with α-methylstyrene, styrene, and polyvinylalcohol. Of the foregoing, a zinc salicylate resin may be particularly suitable as a component of the developer composition. While zinc is the preferred cation, other metal cations may also be used, such as cadmium (III), zirconium (II), cobalt (II), strontium (II), aluminum (III), copper (III), and tin (II).

A formulation that may be used to print or apply the developer composition onto the substrate 60 may include binders, pigments, surfactacts, water and the like. A particularly useful formulation is provided in the following table.

TABLE 3

| Developer Composition | Weight Percent Range |
| --- | --- |
| PENSIZE Starch binder | 10-20 |
| SATINTONE 5 HB pigment | 10-20 |
| Zinc salicylate resin | 45-65 |
| Glycol | 1.0-3.0 |
| Defoamer | 1.0-2.0 |
| Water | 5-15 |

Another color developer formulation that may be used is a substantially aqueous color developer composition. The substantially aqueous color developer composition includes from about 30 to about 65 wt. % zinc chloride, from about 10 to about 25 wt. % water, from about 10 to about 25 wt. % propylene glycol, and from about 10 to about 25 wt. % isopropyl alcohol.

Figure 13:
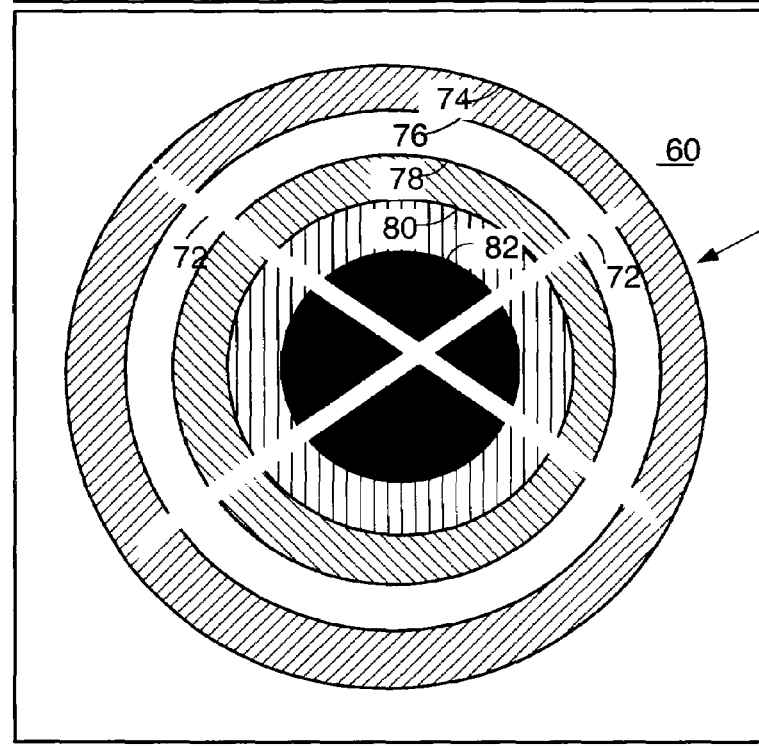
FIG. 13 is a plan view of the substrate of FIG. 11 after coloring devices have applied one or more chromogenic compounds to the substrate containing the developer.
Figure 10:
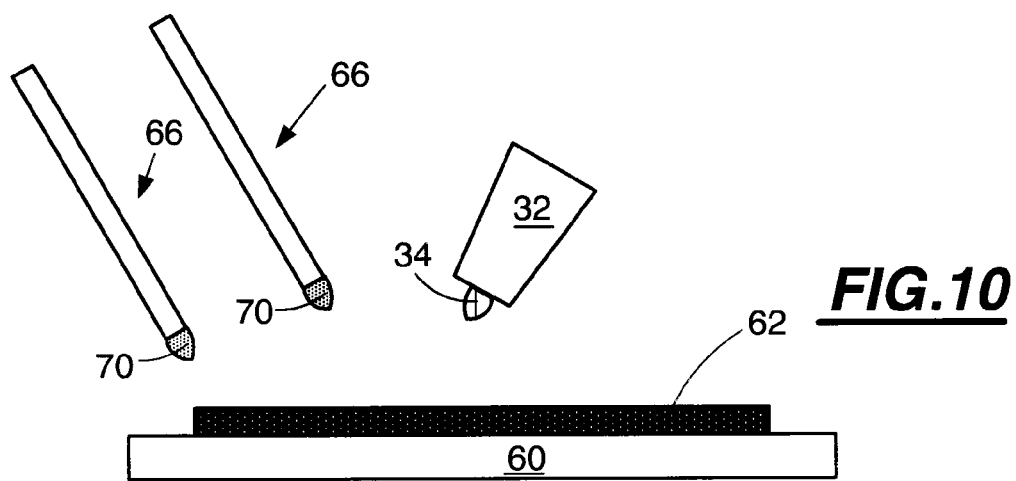
FIG. 10 is an elevational view, not to scale, of a developer printed substrate, coloring device, and image blocking device according to another embodiment of the disclosure.
Figure 11:
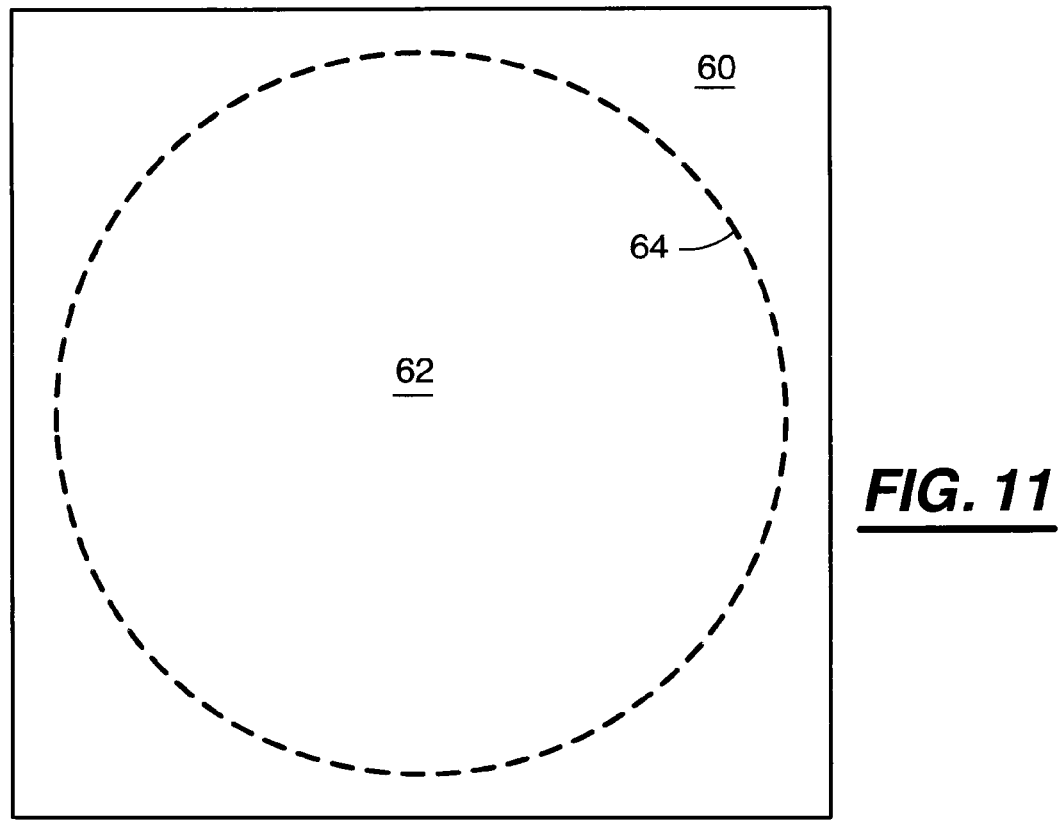
FIG. 11 is a plan view of a substrate having a developer compound printed thereon according to the embodiment of FIG. 10.

In order to provide an image on the substrate 60, a marking instrument 66, or plurality of marking instruments 66 containing different substantially colorless chromogenic compounds may be used to apply the chromogenic compounds to the developer layer 62 to produce a visible image 68 as shown in FIG. 13. The marking instrument 66 may contain a mixture of the chromogenic compound dissolved in an organic solvent and/or water for application to the developer layer 62 through a felt tip 70 portion of the instrument 66.

A formulation containing the colorless chromogenic compound for use in the marking instruments 66 may include from about 75 to about 95 percent by weight alcohol, from about 2 to about 15 percent by weight of the chromogenic compound, and from about 1 to about 10 percent by weight glycol ether. Alcohol solvents which may be used, include, but are not limited to, $C_1$ to $C_4$ alkyl alcohols such as is ethanol, methanol or isopropanol, n-propyl alcohol and the like. Other solvent that may be used include, but are not limited to, $C_1$ to $C_4$ alkyl ethers, $C_1$ to $C_4$ alkyl esters, ketones and acetates. Ketones may include methyl ethyl ketone and acetone. The embodiments described herein also contemplate colorless chromogenic compounds that may be applied with fingers instead of the marking instruments 66.

Prior to applying chromogenic compounds to the developer layer 62 using one or more different color markers 66, a blocking composition may be applied to the developer layer 62 to prevent development of color upon application of the chromogenic compound to the developer layer 62. Accordingly, the blocking instrument 32 containing the blocking composition described above may be used to provide blocked areas 72, illustrated in outline in FIG. 12 on the developer layer 62. Upon use of the markers 66 with the developer layer 62, the blocked areas 72 remain uncolored as illustrated in FIG. 13 while the remaining portions of the developer layer 62 provide colored images represented by concentric circles 74-82. Each of the concentric circles 74-82 in FIG. 13 represents an image drawn with a different color marker 66. However, a single color marker 66 may also be used with the developer layer 62.

Having described various aspects and exemplary embodiments and several advantages thereof, it will be recognized by those of ordinary skills that the disclosed embodiments are susceptible to various modifications, substitutions and revisions within the spirit and scope of the appended claims.

What is claimed is:

1. A latent image developing system, comprising:
   a first substrate containing a colorless image deposited on a first surface thereof;

a developer component selected from the group consisting of a developer instrument, a developer finger paint, a developer coating on a first surface of a substantially transparent substrate for adhesive attachment to the first substrate, and a combination of one or more of the developer instrument, the developer finger paint, and the developer coating, wherein the developer component is reactive with the colorless image to provide a visible image; and an image blocking instrument for concealing at least a portion of the visible image, the image blocking instrument comprising a blocking composition applicator and an aqueous mixture of blocking composition and water.

2. The latent image developing system of claim 1, wherein the colorless image comprises one or more substantially colorless chromogenic compounds selected from the group consisting of colorless dyes, colorless pigments, and combinations thereof.

3. The latent image developing system of claim 1, wherein the colorless image comprises an image deposited on the substrate from a composition comprising a flexographic ink base and a substantially colorless chromogenic composition.

4. The latent image developing system of claim 1, wherein the developer component comprises a developer compound selected from the group consisting of phenolic resins, sulfone compounds, alkylhydroxybenzoic acid compounds, salicylic acid, salicylic acid metal salts, unsubstituted phenols, and ring-substituted phenols.

5. The latent image developing system of claim 1, wherein the developer instrument comprises a zinc salicylate resin in a carrier fluid.

6. The latent image developing system of claim 1, wherein the developer component comprises a developer compound selected from the group consisting of phenolic resins, sulfone compounds, alkylhydroxybenzoic acid compounds, salicylic acid, salicylic acid metal salts, unsubstituted phenols, and ring-substituted phenols; a micro-encapsulated solvent substantially devoid of chromogenic compounds and developer compounds; and an aqueous-based pressure sensitive adhesive.

7. The latent image developing system of claim 1, wherein the first substrate further comprises a component selected from the group consisting of an aqueous-based pressure sensitive adhesive and a micro-encapsulated solvent that is substantially devoid of chromogenic compounds and developer compounds.

8. The latent image developing system of claim 1, wherein the blocking composition comprises from about 15 to about 35 weight percent triethanolamine and from about 65 to about 85 weight percent water.

9. A novelty kit comprising:

a first substrate containing a colorless image deposited on a first surface thereof;

a developer component selected from the group consisting of a developer instrument, a developer finger paint, a developer coating on a first surface of a second substrate for adhesive attachment to the first substrate, and a combination of one or more of the developer instrument, the developer finger paint, and the developer coating, wherein the developer component is reactive with the colorless image to provide a visible image; and an image blocking instrument for concealing at least a portion of the visible image, the image blocking instrument comprising a blocking composition applicator and an aqueous mixture of blocking composition and water.

10. The novelty kit of claim 9, wherein the colorless image comprises a substantially colorless chromogenic composition comprising one or more chromogenic compounds selected from the group consisting of colorless dyes, colorless pigments, and combinations thereof.

11. The novelty kit of claim 9, wherein the developer component comprises a developer compound selected from the group consisting of phenolic resins, sulfone compounds, alkylhydroxybenzoic acid compounds, salicylic acid, salicylic acid metal salts, unsubstituted phenols, and ring-substituted phenols.

12. The novelty kit of claim 9, wherein the developer instrument comprises a zinc salicylate resin in a carrier fluid.

13. The novelty kit of claim 9, wherein the developer component comprises a developer compound selected from the group consisting of phenolic resins, sulfone compounds, alkylhydroxybenzoic acid compounds, salicylic acid, salicylic acid metal salts, unsubstituted phenols, and ring-substituted phenols; a micro-encapsulated solvent substantially devoid of chromogenic compounds and developer compounds; and an aqueous-based pressure sensitive adhesive.

14. The novelty kit of claim 9, wherein the first substrate further comprises a component selected from the group consisting of an aqueous-based pressure sensitive adhesive and a micro-encapsulated solvent that is substantially devoid of chromogenic compounds and developer compounds.

15. The novelty kit of claim 9, wherein the blocking composition comprises from about 15 to about 35 weight percent triethanolamine and from about 65 to about 85 weight percent water.

* * * * *